US009489286B2

(12) United States Patent
Arora et al.

(10) Patent No.: US 9,489,286 B2
(45) Date of Patent: Nov. 8, 2016

(54) METHOD AND SYSTEM FOR COMPUTER ASSISTED HOT-TRACING MECHANISM

(71) Applicant: NEC Laboratories America, Inc., Princeton, NJ (US)

(72) Inventors: Nipun Arora, Plainsboro, NJ (US); Hui Zhang, Princeton Junction, NJ (US); Junghwan Rhee, Princeton, NJ (US); Guofei Jiang, Princeton, NJ (US); Kenji Yoshihira, Princeton Junction, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/168,375

(22) Filed: Jan. 30, 2014

(65) Prior Publication Data

US 2014/0229921 A1 Aug. 14, 2014

Related U.S. Application Data

(60) Provisional application No. 61/758,424, filed on Jan. 30, 2013.

(51) Int. Cl.
*G06F 9/44* (2006.01)
*G06F 11/36* (2006.01)

(52) U.S. Cl.
CPC ....... *G06F 11/3644* (2013.01); *G06F 11/3636* (2013.01)

(58) Field of Classification Search
None
See application file for complete search history.

(56) References Cited

U.S. PATENT DOCUMENTS

| | | | | |
|---|---|---|---|---|
| 5,946,486 A * | 8/1999 | Pekowski | | 717/128 |
| 7,624,405 B1 * | 11/2009 | Legg et al. | | 719/331 |
| 7,793,304 B2 * | 9/2010 | Schank et al. | | 719/320 |
| 7,886,287 B1 * | 2/2011 | Davda | | 717/168 |
| 2004/0107416 A1 * | 6/2004 | Buban et al. | | 717/170 |
| 2006/0288341 A1 * | 12/2006 | Wurden et al. | | 717/168 |
| 2009/0106741 A1 * | 4/2009 | Dageville et al. | | 717/128 |
| 2009/0271768 A1 * | 10/2009 | Goodson | | 717/125 |
| 2012/0066484 A1 * | 3/2012 | Yin et al. | | 712/244 |
| 2013/0024435 A1 * | 1/2013 | Poirier et al. | | 707/695 |
| 2013/0132780 A1 * | 5/2013 | Bohnet et al. | | 714/45 |

* cited by examiner

*Primary Examiner* — Evral E Bodden
(74) *Attorney, Agent, or Firm* — Joseph Kolodka

(57) ABSTRACT

This invention provides a new mechanism for "Hot-Tracing" using a novel placeholder mechanism and binary rewriting techniques, which leverages existing compiler flags in order to enable light-weight and highly flexible dynamic instrumentation. Broadly, I-Probe can be divided in 2 distinct workflows—1. Pre-processing (ColdPatch), and 2. Hot Tracing. The first phase is a pre-processing mechanism to prepare the binary for phase 2. The second phase is the actual hot-tracing mechanism, which allows users to dynamically instrument functions (more specifically symbols) of their choice.

16 Claims, 4 Drawing Sheets

METHOD AND SYSTEM FOR COMPUTER ASSISTED HOT-TRACING MECHANISM

RELATED APPLICATION INFORMATION

This application claims priority to provisional application No. 61/758,424, filed Jan. 30, 2013, entitled "User-Level Dynamic Instrumentation with Compiler Assistance", the contents thereof are incorporated herein by reference.

BACKGROUND OF THE INVENTION

The present invention relates generally to software system performance diagnosis, and more particularly, to computer assisted hot-tracing mechanism.

The following background references are discussed herein:
[1] gdb: The GNU Project Debugger.
[2] Nicholas Nethercote and Julian Seward. Valgrind: a framework for heavyweight dynamic binary instrumentation. In Proceedings of the 2007 ACM SIGPLAN conference on Programming language design and implementation (PLDI '07). ACM, New York, N.Y., USA, 89-100.
[3] Process Trace Linux (PTrace).
[4] C.-K. Luk, R. Cohn, R. Muth, H. Patil, A. Klauser, G. Lowney, S. Wallace, V. J. Reddi, and K. Hazelwood. Pin: building customized program analysis tools with dynamic instrumentation. In Proceedings of the 2005 ACM SIGPLAN conference on Programming language design and implementation, PLDI '05, pages 190-200, New York, N.Y., USA, 2005. ACM.
[5] V. Prasad, W. Cohen, F. C. Eigler, M. Hunt, J. Keniston, and B. Chen. Locating system problems using dynamic instrumentation. In *Proceedings of the* 2005 *Ottawa Linux Symposium* (*OLS*) (July 2005).
[6] B. M. Cantrill, M. W. Shapiro, and A. H. Leventhal. Dynamic instrumentation of production systems. In *Proceedings of the annual conference on USENIX Annual Technical Conference*, ATEC '04, pages 2-2, Berkeley, Calif., USA, 2004. USENIX Association.
[7] Úlfar Erlingsson, Marcus Peinado, Simon Peter, and Mihai Budiu. 2011. Fay: extensible distributed tracing from kernels to clusters. In *Proceedings of the Twenty-Third ACM Symposium on Operating Systems Principles* (SOSP '11). ACM, New York, N.Y., USA, 311-326.

Large-scale complex systems often have hidden bugs/mis-configurations etc., which are difficult to detect. This problem is further compounded by the fact that many applications are implemented at large scale, and cannot be tested in real world scenarios during the development stage. Hence, bugs or resource mismanagement problems are almost impossible to replicate in a debugging environment. As systems become more complex monitoring solutions are required to be enable a deeper analysis of the system.

While a lot of monitoring solutions are available in the market, most of these suffer from either a heavy overhead, or run on predefined functions hence reducing usability. Alternatively, most solutions also require changes to the kernel or application itself to allow for implementation.

Conventional debugging techniques by such as GDB [1], valgrind[2], ptrace[3], and pin[4], run the entire process in debug mode, allowing developers to oversee the entire execution of the process. Hence each instruction executed in the application can easily be captured backtracked and scrutinized. However, such an approach enforces a considerable performance overhead, which is not practical for deployed systems. It is also not possible to observe the true behavior of the application when executing in the debug mode as it considerably changes the behavior of the application. Hence a very lightweight and non-intrusive approach is needed.

Other modern approaches such as those followed by System Tap[5], only capture kernel level events, which are not often not useful from the perspective of a debugger. The D-Trace[6] architecture attempts to capture all level events but uses a h/w trap mechanism to context switch to kernel space, this results in a heavier overhead. A lesser known technique applied by Fay[7], leverages the fact that recent windows binaries have a free space at the start instructions which it uses to make a trampoline function based instrumentation. While trampoline mechanism also has an overhead (albeit significantly less than D-Trace), this approach is restricted to windows where the native binaries support such a mechanism. Another key limitation of these approaches is that they need a special infrastructure/API to be installed in the kernel, which acts as a middle layer interface, compared to our technique, which will allow applications to execute in the native environment.

The closest work to I-Probe is DTrace[6] and Fay[7], shown in FIG. 6 (prior art) the key differences/novelties of I-Probe compared to these approaches:

1. Zero-Effect and Zero-Overhead hot patching mechanism:
    A zero probe light-weight compiler assisted hot-patching mechanism. The key idea being to leverage existing compiler technology, to allow for very lightweight hot-patching instrumentation in large scale systems.
2. Platform-indepent, and no changes required in the kernel:
    Since the inventive I-Probe is compiler driven it is platform independent, it simply needs exiting compiler flags/options to introduce calls to functions, which can be used as placeholders. This is available in several compilers such as visual C++, and GNU compilers. On the other hand similar infrastructures like D-Trace nor Fay are platform dependent as they need to introduce changes in the kernel as they either need a special b/w trap mechanism or a special binary format which already has empty space (windows).
3. Completely inline hot-tracing:
    The invention's instrumentation is completely inline, hence it avoids overhead similar to kernel trap mechanisms in D-Trace, or alternatively trampoline mechanisms in Fay, this makes it extremely efficient with lesser overhead and overall a simple and clean implementation.
4. User-space only logging:
    The invention's instrumentation has a user-space only logging, hence there is no unnecessary context-switch between the process and the kernel.

BRIEF SUMMARY OF THE INVENTION

The invention is directed to a computer implemented method for monitoring systems for misconfigurations difficult to detect, including employing a cold patch preprocess for preparing a target application for hot tracing including adding placeholders to binary using selective compiler flags; implementing instrumentation or de-instrumentation at a run time of the target application enabled by the hot tracing; preloading the instrumentation in the form of a shared library before start of execution of the target application, generating a list of offsets that act as placeholders for the hot tracing; and providing interactive graphical user interfaces for the cold patch and the hot tracing, wherein the hot tracing enables users to dynamically instrument functions in the system for monitoring for misconfigurations.

In a similar aspect of the invention there is provided system for monitoring for misconfigurations difficult to detect in large scale complex systems including a cold patch preprocess for preparing a target application for hot tracing including adding placeholders to binary using selective compiler flags, an instrumentation or de-instrumentation implemented at a run time of the target application enabled by the hot tracing, a shared library from preloading the instrumentation before start of execution of the target application, and a list of offsets generated that act as placeholders for the hot tracing; and interactive graphical user interfaces provided for the cold patch and the hot tracing, wherein the hot tracing enables users to dynamically instrument functions in the system for monitoring for misconfigurations.

These and other advantages of the invention will be apparent to those of ordinary skill in the art by reference to the following detailed description and the accompanying drawings.

DETAILED DESCRIPTION

The present invention is directed to a mechanism to leverage commonly used/available compiler flags in GNU C/C++ compilers(-instrument-functions) and use them for a completely novel workflow to provide an easy to use dynamic instrumentation mechanism. One of the major advantages of leveraging already existing compiler flags is that we need no compiler modification, and we are still able to outperform existing binary only approaches. Another key feature is that we allow the application to run in it's native environment instead of making a middle layer (as is done by most existing systems), this provides ease of use, and easy adaption by the user.

The invention implements I-Probe by post processing the binaries generated (in a mechanism called "coldpatch") and then introduce instrumentation at runtime ("hotpatch"). The inventive mechanism has a "zero probe effect" i.e. there is no overhead when it is not turned on. The instrumentation can capture both function entry and exit points, for inline or non-inlined functions.

The invention's instrumentation mechanism utilizes symbolic information present in binaries to identify functions; hence apart from the change in the compiler flag no source code information is required. We further provide a technique to selectively choose the function to monitor hence reducing the scope of the instrumentation effect.

Overview

This invention provides a new mechanism for "Hot-Tracing" using a novel placeholder mechanism and binary rewriting techniques, which leverages existing compiler flags in order to enable light-weight and highly flexible dynamic instrumentation.

Broadly, I-Probe can be divided in 2 distinct workflows—1. Pre-processing (ColdPatch), and 2. Hot Tracing. The first phase is a pre-processing mechanism to prepare the binary for phase 2. The second phase is the actual hot-tracing mechanism, which allows users to dynamically instrument functions (more specifically symbols) of their choice.

Leveraging pre-existing compiler flags in well-known compilers such as GNU as an enabling mechanism for Hot-Tracing is one of the key novelties introduced by I-Probe. This enabling technique is important as it allows I-Probe to be much more efficient than current dynamic instrumentation techniques, while requiring minimum changes to the system.

Figure 1:
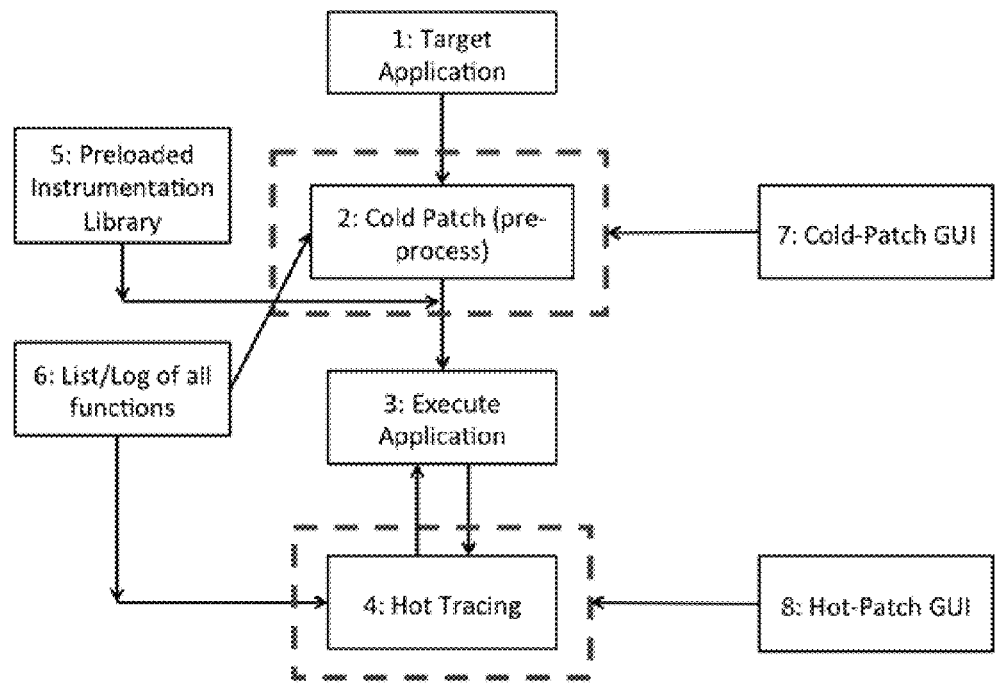
FIG. 1 is shows a high level overview of I-probe and its Hot Tracing aspect, in accordance with the invention.

Turning to the diagram of FIG. 1, there is shown a high lever overview of the present invention's I-probe and its Hot Tracing component. The components of the diagram are as follows;

1: Target Application: This is the input target application along with all it's libraries/dependencies (optional) required to be monitored.
2. Cold-patch (pre-processing): This is the anomaly cold-patch pre-processing and compilation process employed to prepare the application for future hot-tracing mechanism. In this step we add placeholders to the binary using special compiler flags (details explained later).
3. Execute Application: This is simply the execute state or the running state of the application which interacts with our Hot-Tracer module.
4. Hot Tracing: This is module which implements instrumentation/de-instrumentation at run-time of the application, it requires List/Log of offsets of all functions which the user wishes to instrument.
5. Preloaded Instrumentation Library: The instrumentation must be preloaded in the form of a shared library before the start of the execution of the target application. The instrumentation functions are collated from the user and compiled in the form of a shared library.
6. List/Log of all functions: Step 2 also generates a list/log of offsets which act as placeholders for hot-tracing, the significance of this is further explained later).
7. Cold-Patch GUI: This component provides an interactive GUI feature for component 2 (cold-patching).
8. Hot-Patch GUI: This component provides an interactive GUI feature for component 4 (hot-tracing).

Continuing with details of the workflow of the inventive Intelligent Probe mechanism, there is first provided a detail of a block level representation of the cold-patch mechanism, followed by the Hot-Tracing, and Hot-Patching Mechanisms, and then focus on showing an internal state level layout of the patching workflows. Lastly, there is shown a graphic user interface view of how a user can interact with the invention and easily instrument the code.

Figure 2:
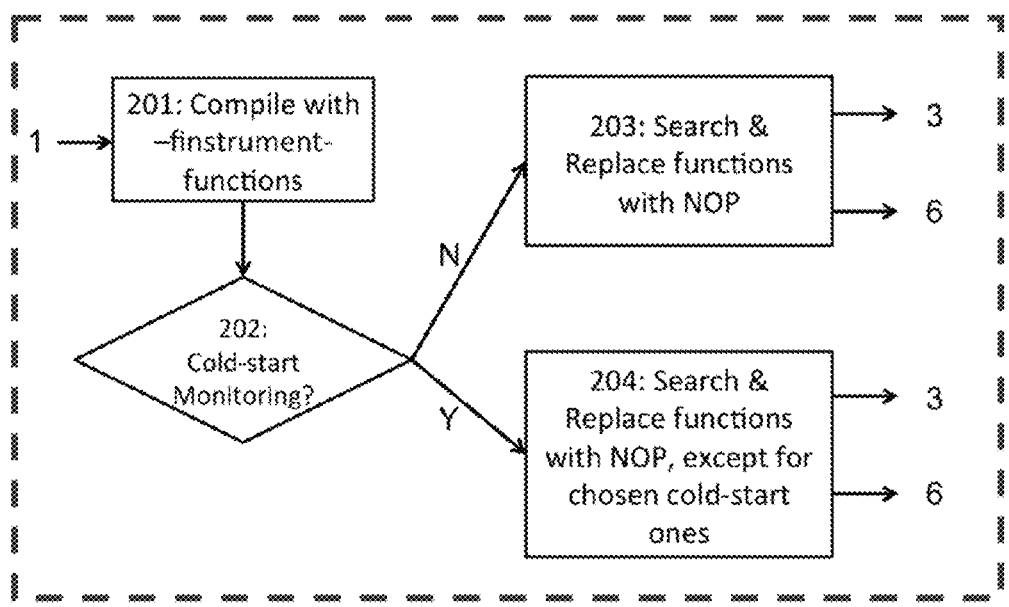
FIG. 2 details the cold patch pre-process aspect shown in FIG. 1.

FIG. 2 shows the cold-patching pre-processing mechanism used by I-Probe to prepare the binaries for hot-patching instrumentation.

201: Compile the source files with—instrument-functions: This flag can be added to makefiles or as a wrapper around gcc. The flag in the compilation stage of gcc introduces calls at the entry and exit of each function to instrumentation functions cyg_func_enter and cyg_func_exit respectively.

202: Is cold-start monitoring required: If cold-starting (i.e. monitoring some functions from the start of the process) is required proceed to 204, else proceed to step 203.

203: Replace all calls to instrumentation functions with NOP: This is a key step in our pre-processing and enabling mechanism. In this step we parse through the binary and look for all calls to symbols cyg_func_enter, and cyg_func_exit. After finding offsets for all these calls, they are replaced by NOP op code. These offsets, act as a placeholder, which can be later replaced with calls to instrumentation functions. At the end our parser generates a list of all the offsets discovered in an executable binary or a shared library, so that they can be used in a later step. A major advantage of this approach is that we are simply using pre-existing flags which are common in most compilers but for generating placeholders.

204: Replace all calls to instrumentation functions with NOP except select functions: Hence if some functions need to be cold-started (i.e. need to start monitoring from the start), the calls to their instrumentation functions are not stripped. This is a simple modification from the previous step(with everything else remaining the same) to give a measure of flexibility to our approach. These calls can always be stripped away in our hot-patching step.

At the end of pre-processing, the invention links the instrumentation library (or preload the instrumentation library using LD_PRELOAD) to the executable, and begin execution.

Figure 3:
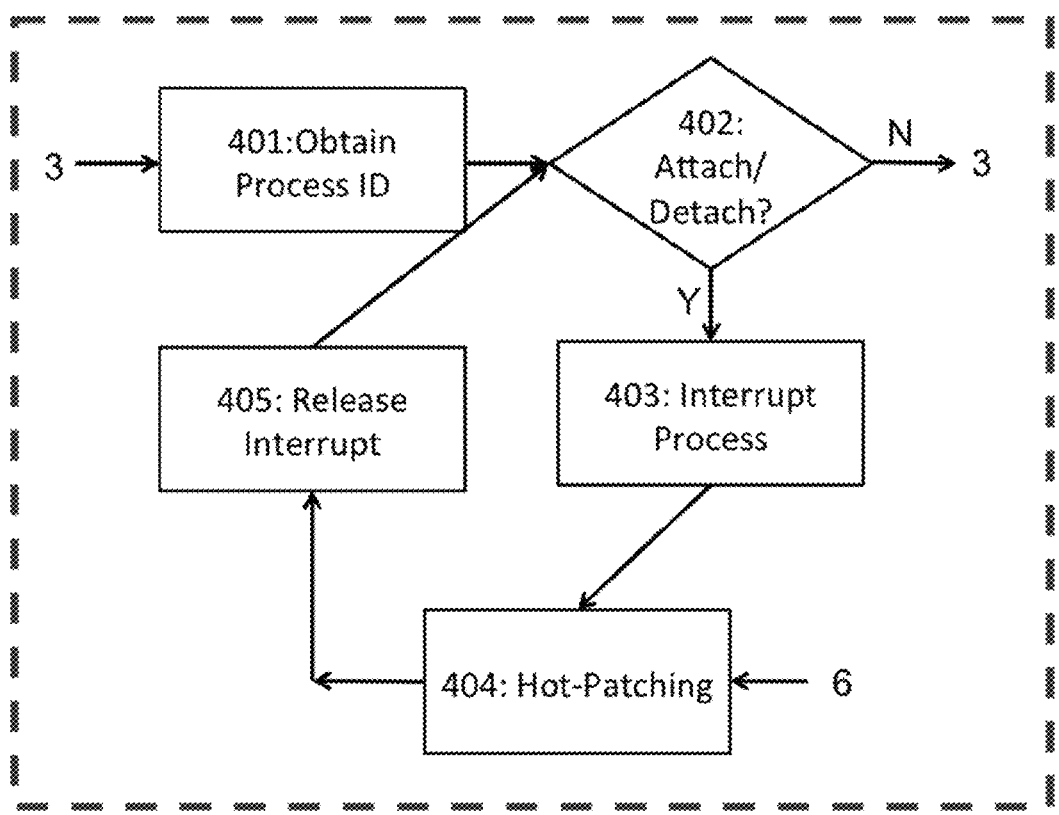
FIG. 3 details the hot tracing aspect shown in FIG. 1.

Turning now to FIG. 3, there is shown a workflow of the Hot tracing process, in accordance with the invention.

Initially, at 401: the process obtains the Process ID of the application to be monitored Attach Monitoring

403: Interrupt the process using the given PID: Interrupt and attach our hot-tracer as a shadow process (similar to attaching a debugger in GDB), to enable modification of the code segment of the program.

404: Hot-Patch the instrumentation for the functions specified by the user to the given binary/shared library using offset list (component 6): This step modifies the code segment to actually add the instrumentation.

405: Release interrupt and let process execute with monitoring turned on: Detach and release our hot-tracer, to allow for normal execution of the modified code segment.

Detach Monitoring

403: Interrupt the process using the given PID: Interrupt and attach to the target process, similar to attach monitoring step.

404: Remove the instrumentation for the functions specified by the user to the given binary/shared library using offset list (component 6): Remove instrumentation for the function by modifying the code segment, to return it to the original state.

405: Release interrupt and let process execute with monitoring turned off: Detach and release to allow for the process to execute non-modified code-segment.

Figure 4:
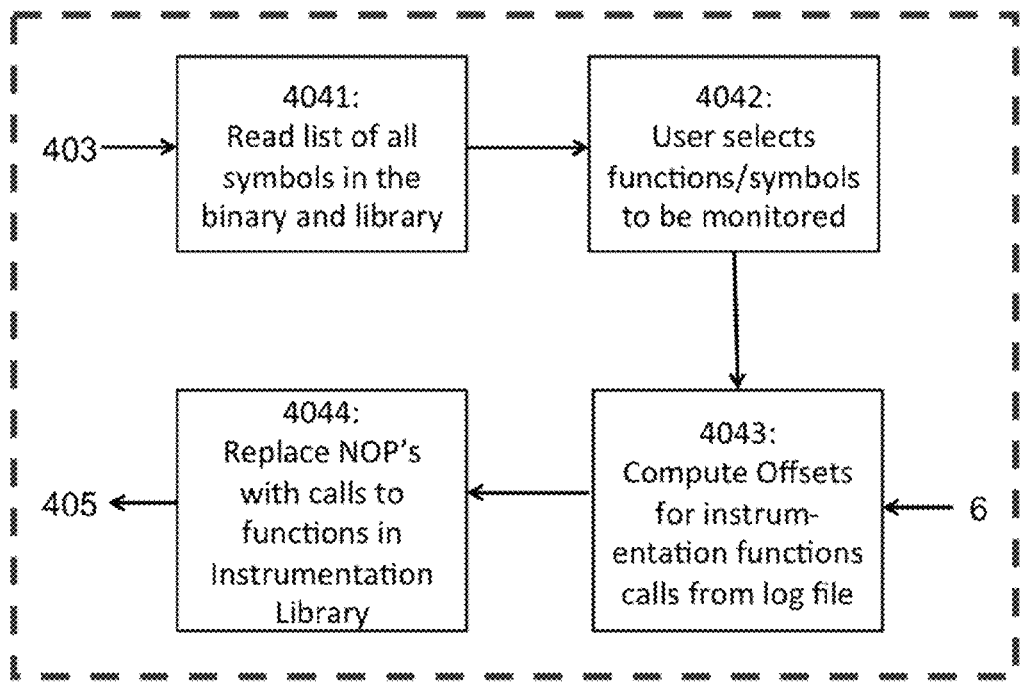
FIG. 4 shows the workflow of how the hotpatch is applied in the binary.

Turning now to FIG. 4, the diagram shows a workflow of how the HotPatch is applied in the binary.

4041: Using the parser read the list of all the symbols/functions present in the binary and provide them to the user

4042: The user choses from the list produced in 4041, the list of functions that need to be instrumented and whether entry points/or exit points need to be instrumented

4043: Using the list of offsets for placeholders from the log file and the binary function addresses, we compute a "belongs to" relationship for each offset to the corresponding function/symbol. Since only a small set of functions are selected by the user, the corresponding offsets are passed on to the next step

4044: Here we replace the NOP placeholder with an instruction calling the instrumentation function. We ensure that we do not overwrite any subsequent

*A key thing to remember: The code segment for all instrumentation functions was already pre-loaded in the form of a shared library at the time of execution. This allows us to simply modify placeholders to actual calls/jumps to the instrumentation library.

Figure 5:
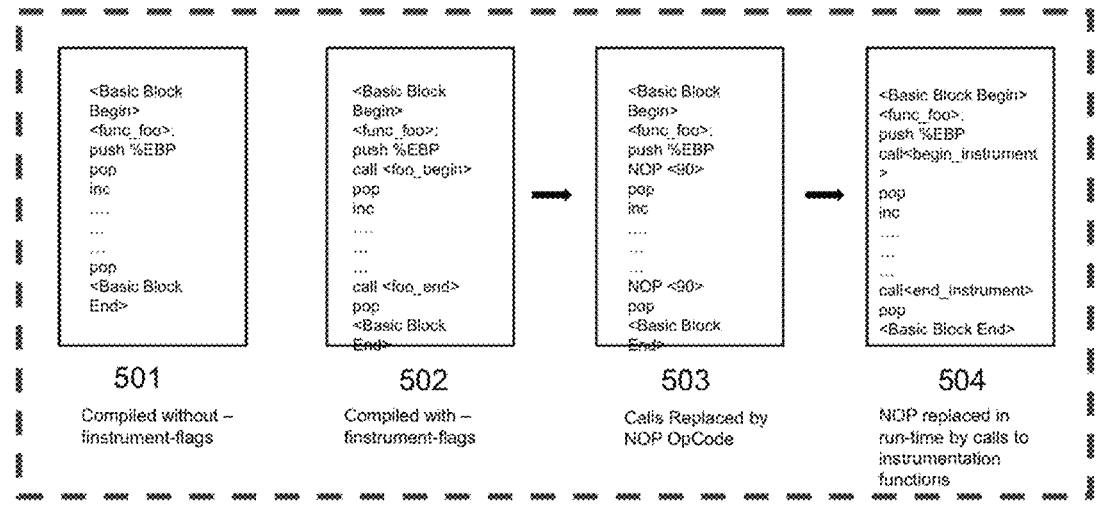
FIG. 5 shows internal binary level state representation of the hotpatching.
Figure 6:
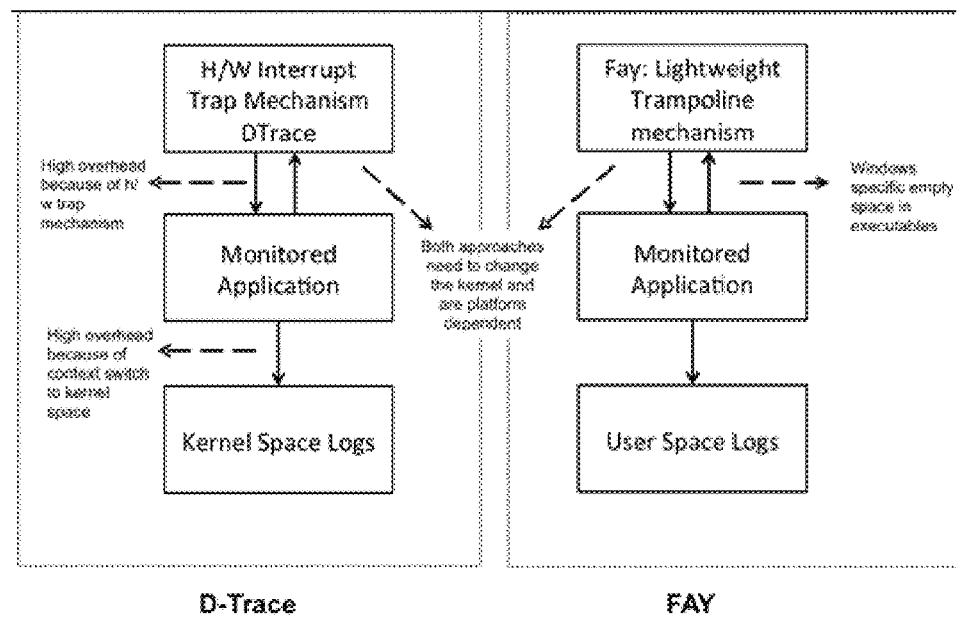
FIG. 6 is a diagram showing workflow and architecture of prior art D-trace and FAY techniques for comparison with the inventive I-Probe presented herein.
Figure 7:
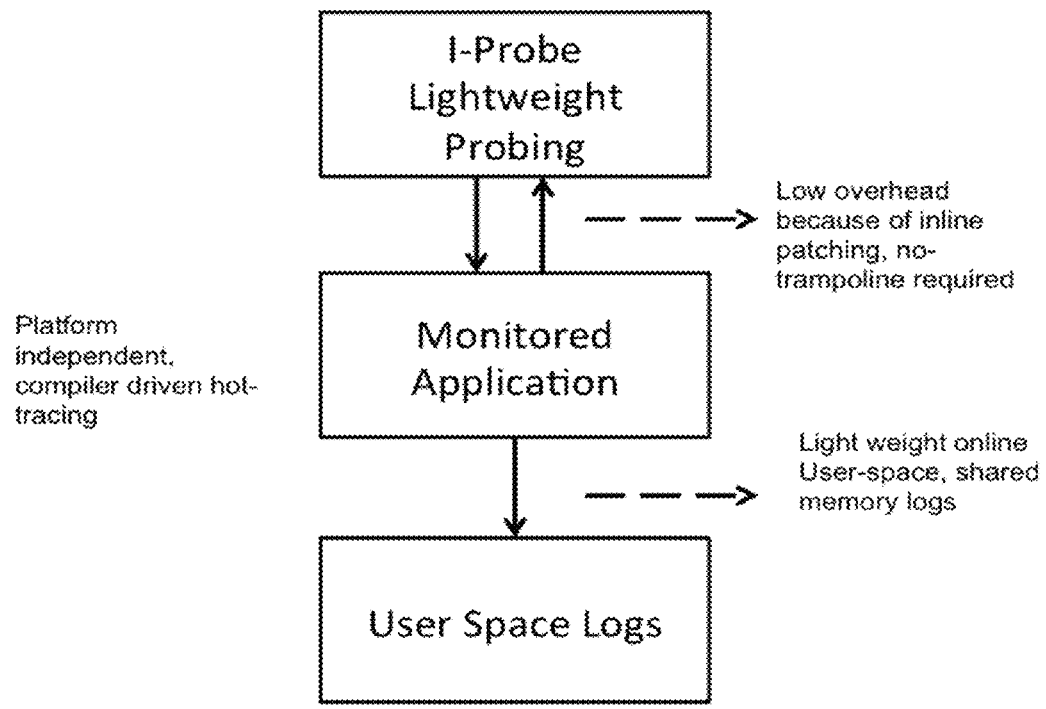
FIG. 7 is a diagram showing key aspects of I-probe and overall workflow, in accordance with the invention.

Internal State Level Representation:

The diagram of FIG. 5 shows an internal binary level state representation of the inventive Intelligent probe mechanism.

501: This state shows the state of the binary when it is compiled without the marker calls which can be used by I-Probe. Hence there are no hooks, which I-Probe can use later.

502: This state shows a binary, which was compiled with markers required by I-Probe, and has a starting and ending instrumentation function in each function. As can be clearly seen each function has calls to the same start functions, and end function names. These can be easily figured out using simple binary analysis, and subsequently the positions of each of them in every user function body.

503: This state shows a modified binary, with all markers replaced by a NOP code, which provides a zero-change effect in the performance as well as logic of the binary. A NOP instruction means "No-Operation" and is skipped by the processer. When the function markers are replaced by NOP's the location of each marker is stored in an external file and is later used by the present hot-patching mechanism to replace the markers by calls to instrumentation functions.

504: This is the state of the binary when a run-time patch is applied so as to replace NOP's with a call to the actual instrumentation functions. As shown above in this state the calls are made to actual instrumentation functions. Allowing for the user to log/debug according to requirements, as coded in the instrumentation library. Hence, providing a seamless "zero-overhead" hot-patching mechanism for the debugger.

A new dynamic instrumentation mechanism. It differs from existing methodologies by using an easy to implement, cleaner, and lower overhead instrumentation technique.

A key aspect of the invention is to leverage commonly available existing compiler flags (GNU—finstrument-functions) (step 201) and use them as placeholders for future Hot-Patching (step 404). The invention provides a novel workflow, whereby it introduces NOP's (step 203) in place of calls introduced using the compiler flag, and then replacing with actual calls depending on the requirement (step 404). Since the placeholders are introduced at the compiler level, it ensures a relatively easy capture of all entry and exit points. Our approach also does not require any complicated trampoline mechanisms or hardware traps, since everything is done inline (hence lower overhead). Step 201, and step 203/204 are key aspects providing pre-processing and cold-patching. Step 404, is a further mechanism in hotpatching that is a key aspect of the invention.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 8:
FIG. 8 shows an exemplary computer to perform the invention.

By way of example, a block diagram of a computer to perform the invention is discussed next in FIG. 8. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention provides a novel monitoring tool called I-Probe (intelligent probe), which leverages existing compiler flags (tested on GNU compiler) as placeholders to enable dynamic instrumentation. We use binary editing and run-time code segment modification to develop a relatively simple and flexible monitoring mechanism. Some of the key features of I-Probe monitoring are the following: Low overhead monitoring; No effect when instrumentation is not turned on, or on segments which are not instrumented (Zero Probe Effect); Platform independent with easy deployment (no changes to kernel/special compiler/VM or run-time interface etc.); User defined scope of instrumentation; Light-weight and transparent recording mechanism; Applied at run-time—Hence, No application restart required; and No modification of source code. The inventive I-Probe is the first monitoring tool to provide all above said features using a single and simple monitoring framework.

The invention herein, aims to provide complimentary features to existing kernel level monitoring system (e.g. NEC Mevalet), or alternatively providing a completely new level of abstraction to do instrumentation independent of kernel level monitoring. The biggest advantage of using I-Probe is it's ease of deployment combined with an extremely light-weight dynamic instrumentation mechanism, while requiring no modification in the operating system.

Most state of art black-box instrumentation mechanisms only allow users to monitor kernel level events with no visibility of user-level events. Using I-Probe we aim to provide to the user a mechanism to capture user-level events/functions, which are more meaningful to the user. This will be especially useful for developers/debuggers to analyze the function. Additionally, it gives the users an opportunity to track function level system usage statistics to locate bottlenecks based on resource usage at the user-code level.

I-Probe and kernel logging can also be used together to provide a unified logging view. We have utilized I-Probe in addition to our Kernel logging tool NEC Mevalet, to capture a complete view of the desired function and the lower level resulting system calls. Since I-Probe works at user-space level, we can instrument not only user-code but system level libraries such as glibc etc, in conjunction with commonly available kernel loggers, we can provide users the capability to instrument/view the entire execution stack.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for monitoring systems for misconfigurations difficult to detect, the method comprising:
    employing a cold patch preprocess using a processor for preparing a target application for hot tracing, the target application having at least one library, the cold patch preprocess including using compiler flags to generate calls to symbols and adding NOPs in place of all the calls to symbols except those that need to be cold started;
    executing the preprocessed target application resulting in a run time of the preprocessed target application;
    interrupting the run time of the preprocessed target application;
    implementing instrumentation or de-instrumentation during the interrupted run time of the preprocessed target application enabled by the hot tracing;
    replacing selected ones of the NOPs with calls to instrumentation depending on functions which a user wishes to instrument;
    preloading the instrumentation in the form of a shared library before start of execution of the preprocessed target application, generating a list of offsets that act as the placeholders for the hot tracing; and
    providing interactive graphical user interfaces for the cold patch and the hot tracing, wherein the hot tracing enables users to dynamically instrument functions in the system for monitoring for misconfigurations.

2. The method of claim 1, wherein the cold patch preprocess comprises compiling source files with instrument functions, a flag in this compilation stage introducing calls at the entry and exit of each function to instrumentation.

3. The method of claim 1, wherein the cold patch preprocess comprises replacing all calls to the instrumentation functions with no-operation instructions (NOP), the replacing step parsing through the binary and looking for all calls to symbols, after finding offsets for all these calls, they are replaced by the NOP op code, these offsets acting as placeholder that can be later replaced with calls to the instrumentation functions.

4. The method of claim 3, wherein the cold patch further comprises a parser generating a list of all offsets discovered in an executable binary or a shared library, enabling using pre-existing flags which are common in most compilers but for generating placeholders.

5. A computer implemented method for monitoring systems for misconfigurations difficult to detect, the method comprising:
employing a cold patch preprocess using a processor for preparing a target application for hot tracing, the target application having at least one library, the cold patch preprocess including using compiler flags to generate calls to symbols and adding NOPs in place of all the calls to symbols except those that need to be cold started;
executing the preprocessed target application resulting in a run time of the preprocessed target application;
interrupting a run time of the preprocessed target application;
implementing instrumentation or de-instrumentation during the interrupted run time of the preprocessed target application enabled by the hot tracing;
replacing selected ones of the NOPs with calls to instrumentation depending on functions which a user wishes to instrument;
preloading the instrumentation in the form of a shared library before start of execution of the preprocessed target application, generate ng a list of offsets that act as the placeholders for the hot tracing; and
providing interactive graphical user interfaces for the cold patch and the hot tracing, wherein the hot tracing enables users to dynamically instrument functions in the system for monitoring for misconfigurations;
wherein the cold patch preprocess comprises replacing all calls to instrumentation function with no-operation instructions NOP except select functions.

6. The method of claim 5, wherein the cold patch preprocess comprises at the end of the cold patch preprocess linking an instrumentation library to an executable and beginning execution.

7. The method of claim 1, wherein the hot tracing comprises a hotpatch of the instrumentation for functions specified by the user to a given binary or shared library using the offset list, the hot patching including modifying code segment to add the instrumentation.

8. The method of claim 1, wherein the hot tracing comprises a hotpatch for removing instrumentation functions for functions specified by the user to a given binary or shared library using the offset list, the hotpatch including removing instrumentation for the function by modifying a code segment and returning it to an original state.

9. A system for monitoring for misconfigurations difficult to detect in large scale complex systems, the system comprising:
a processor executing instructions stored in a memory to:
cold patch preprocess a target application to prepare it for hot tracing, the target application having at least one library, the cold patch preprocess including using compiler flags to generate calls to symbols and adding NOPs in place of all the calls to symbols except those that need to be cold started;
interrupt a run time of the preprocessed target application;
implement instrumentation or de-instrumentation during the interrupted run time of the preprocessed target application enabled by the hot tracing;
generate a shared library from preloading the instrumentation before start of execution of the preprocessed target application; and
generate a list of offsets generated that act as placeholders for the hot tracing; and
interactive graphical user interfaces provided for the cold patch and the hot tracing,
wherein the hot tracing enables users to dynamically instrument functions in the system for monitoring for misconfigurations.

10. The system of claim 9, wherein the cold patch preprocess comprises compiling source files with instrument functions, a flag in this compilation stage introducing calls at the entry and exit of each function to instrumentation.

11. The system of claim 9, wherein the cold patch preprocess comprises replacing all calls to the instrumentation functions with no-operation instruction (NOP), the replacing step parsing through the binary and looking for all calls to symbols, after finding offsets for all those calls, they are replaced by the NOP op code, these offsets acting as a placeholder that can be later replaced with calls to the instrumentation functions.

12. The system of claim 11, wherein the cold patch further comprises a parser generating a list of all offsets discovered in an executable binary or a shared library, enabling using pre-existing flags which are common in most compilers but for generating placeholders.

13. A system for monitoring for misconfigurations difficult to detect in large scale complex systems, the system comprising:
a processor executing instructions stored in a memory to:
cold patch preprocess a target application to prepare it for hot tracing, the target application having at least one library, the cold patch preprocess including using compiler flags to generate calls to symbols and adding NOPs in place of all the calls to symbols except those that need to be cold started;
interrupt a run time of the preprocessed target application;
implement instrumentation or de-instrumentation during the interrupted run time of the preprocessed target application enabled by the hot tracing;
replace selected ones of the NOPs with calls to instrumentation depending on functions which a user wishes to instrument;
generate a shared library from preloading the instrumentation before start of execution of the preprocessed target application, and
generate a list of offsets generated that act as placeholders for the hot tracing; and
interactive graphical user interfaces provided for the cold patch and the hot tracing;
wherein the hot tracing enables users to dynamically instrument functions in the system for monitoring for misconfigurations; and
wherein the cold patch preprocess comprises replacing all calls to instrumentation functions with no-operation instructions NOP except select functions.

14. The system of claim 13, wherein the cold patch preprocess comprises at that end of the cold patch preprocess linking an instrumentation library to an executable and beginning execution.

15. The system of claim 9, wherein the hot tracing comprises a hotpatch of the instrumentation for functions specified by the user to a given binary or shared library using the offset list, the hot patching including modifying code segment to add the instrumentation.

16. The system of claim 9, wherein the hot tracing comprises a hotpatch for removing instrumentation functions for functions specified by the user to a given binary or shared library using the offset list, the hotpatch including removing instrumentation for the function by modifying a code segment and returning it to an original state.

\* \* \* \* \*